(12) United States Patent
Lau

(10) Patent No.: US 9,288,858 B2
(45) Date of Patent: Mar. 15, 2016

(54) LIGHT-EMITTING DIODE LIGHTING SYSTEM

(71) Applicant: Energy Saving Lighting Controller Limited, Hong Kong (HK)

(72) Inventor: Chuen Chiu Lau, Hong Kong (HK)

(73) Assignee: ENERGY SAVING LIGHTING CONTROLLER LIMITED, Hong Kong (HK)

( * ) Notice: Subject to any disclaimer, the term of this patent is extended or adjusted under 35 U.S.C. 154(b) by 0 days.

(21) Appl. No.: 14/474,195

(22) Filed: Sep. 1, 2014

(65) Prior Publication Data

US 2015/0061516 A1    Mar. 5, 2015

(30) Foreign Application Priority Data

Sep. 2, 2013   (CN) .................... 2013 2 0541334 U
Dec. 10, 2013  (CN) .................... 2013 1 0671668

(51) Int. Cl.
    *H05B 33/08*        (2006.01)

(52) U.S. Cl.
    CPC .......... *H05B 33/0815* (2013.01); *H05B 33/083* (2013.01); *H05B 33/0827* (2013.01); *H05B 33/0821* (2013.01); *Y02B 20/42* (2013.01)

(58) Field of Classification Search
    CPC ............. H05B 4/2827; H05B 41/2828; H05B 41/2325; H05B 41/2928; H05B 41/2821; H05B 41/28; H01F 38/10
    USPC .......... 315/247, 185 S, 209 R, 274–290, 137, 315/141, 142, 143, 185 R, 200 R, 206, 219, 315/220, 246, 250, 254, 255, 256
    See application file for complete search history.

(56) References Cited

U.S. PATENT DOCUMENTS

| 4,866,344 | A  | * | 9/1989  | Ross ...................... H01J 25/38 315/3.5 |
| 5,568,005 | A  | * | 10/1996 | Davidson ............... G01H 11/02 310/311 |
| 6,301,280 | B1 | * | 10/2001 | Broutin ................... H01S 3/131 372/29.01 |
| 6,459,213 | B1 | * | 10/2002 | Nilssen ............. H02M 7/53832 315/209 R |
| 9,055,619 | B1 | * | 6/2015  | Cavolina ............ H05B 41/2827 |

FOREIGN PATENT DOCUMENTS

| CN | 2061640 U | 9/1990 |
| CN | 2877183 Y | 3/2007 |

(Continued)

OTHER PUBLICATIONS

International Search Report of counterpart PCT Patent Application No. PCT/CN2014/085695 issued on Nov. 26, 2014.

(Continued)

*Primary Examiner* — Tuyet Vo

(57) ABSTRACT

The present application discloses a light-emitting diode (LED) lighting system, including: a toroidal transformer comprising a pair of input terminals and a pair of output terminals; and an illuminant comprising an LED circuit; wherein the illuminant is electrically connected to the pair of output terminals of the toroidal transformer. The present application uses a toroidal transformer to simplify a circuit and reduce the number of electronic parts used. On one hand, a service life of a product can be prolonged, and on the other hand, costs can be reduced and a recycling rate is high, which is beneficial to environmental protection.

20 Claims, 8 Drawing Sheets

(56) References Cited

FOREIGN PATENT DOCUMENTS

| CN | 201504338 U | 6/2010 |
| CN | 201651870 U | 11/2010 |
| CN | 102014555 A | 4/2011 |
| CN | 202521440 U | 11/2012 |

OTHER PUBLICATIONS

1st Office Action of counterpart Chinese Patent Application No. 201310671668.4 issued on Jan. 4, 2016.

* cited by examiner

LIGHT-EMITTING DIODE LIGHTING SYSTEM

CROSS REFERENCES TO RELATED APPLICATION

This application claims the benefit of Chinese Patent Application Nos. 201320541334.0 filed on Sep. 2, 2013 and 201310671668.4 filed on Dec. 10, 2013; the contents of both of which are hereby incorporated by reference.

BACKGROUND

1. Technical Field

The present application relates to a light-emitting diode (LED), and in particular, to an LED lighting system.

2. Related Art

An LED is a device including a single PN junction and having unilateral conductivity. An LED drive circuit is a circuit that enables an LED to give out light. An LED is conventionally defined as a low-voltage direct current product, and a drive circuit of the LED is also designed according to this definition. FIG. 1 shows a typical LED drive circuit. It can be seen that the LED drive circuit includes multiple electronic devices such as a rectifier diode, an electrolytic capacitor, an inductor, and a chip. This causes an LED product to have high energy consumption and a short service life, and moreover, a large number of devices are wasted.

SUMMARY

In one aspect, the present patent application is directed to a light-emitting diode (LED) lighting system, including: a plurality of external alternating current power sources having different electrical parameters; a switch circuit including an input terminal and an output terminal, and the input terminal of the switch circuit being electrically connected to one of the plurality of external alternating current power sources in a switching manner; a toroidal transformer including a plurality pairs of input terminals and a plurality pairs of output terminals, and the output terminal of the switch circuit being electrically connected to one pair of the plurality pairs of input terminals of the toroidal transformer in a switching manner; and a plurality of illuminants each including an LED circuit, and each of the plurality of illuminants being electrically connected to one pair of the plurality pairs of output terminals of the toroidal transformer.

The LED circuit may include an LED anti-parallel circuit. The LED anti-parallel circuit may include a plurality of LED parallel branches; and each of the plurality of LED parallel branches may include a plurality of LEDs connected in series in a same direction.

Each of the plurality of illuminants may include a plurality of LED anti-parallel circuits connected in series. Each of the plurality of illuminants may also include a plurality of LED anti-parallel circuits connected in parallel. Each of the plurality of illuminants may further include a rectifying circuit electrically connected between the LED circuit and the one pair of the plurality pairs of output terminals of the toroidal transformer.

In another aspect, the present patent application is directed to a light-emitting diode (LED) lighting system, including: a toroidal transformer including a pair of input terminals and a pair of output terminals; and an illuminant including an LED circuit; wherein the illuminant is electrically connected to the pair of output terminals of the toroidal transformer.

The LED lighting system may include a plurality of illuminants; wherein the toroidal transformer may include a plurality pairs of output terminals; and each of the plurality of illuminants is electrically connected to one pair of the plurality pairs of output terminals of the toroidal transformer.

The LED lighting system may further include a switch circuit including an input terminal and an output terminal; wherein the toroidal transformer may include a plurality pairs of input terminals; and the input terminal of the switch circuit is electrically connected to an external alternating current power source, and the output terminal of the switch circuit is electrically connected to one pair of the plurality pairs of input terminals of the toroidal transformer in a switching manner.

The LED lighting system may further include a switch circuit including an input terminal and an output terminal; and an external alternating current power source connected to the input terminal of the switch circuit; wherein the toroidal transformer may include a plurality pairs of input terminals; and the output terminal of the switch circuit is electrically connected to one pair of the plurality pairs of input terminals of the toroidal transformer in a switching manner.

The LED lighting system may further include a switch circuit including an input terminal and an output terminal; and a plurality of external alternating current power sources having different electrical parameters; wherein the input terminal of the switch circuit is electrically connected to one of the plurality of external alternating current power sources in a switching manner; and the toroidal transformer may include a plurality pairs of input terminals; and the output terminal of the switch circuit is electrically connected to one pair of the plurality pairs of input terminals of the toroidal transformer in a switching manner.

The plurality of external alternating current power sources may include an alternating current power source having an output voltage of 110V and an alternating current power source having an output voltage of 220V.

The LED circuit may include an LED anti-parallel circuit. The LED anti-parallel circuit may include a plurality of LED parallel branches; and each of the plurality of LED parallel branches may include a plurality of LEDs connected in series in a same direction.

The illuminant may include a plurality of LED anti-parallel circuits connected in series. Each of the plurality of LED anti-parallel circuits may include a plurality of LED parallel branches; and each of the plurality of LED parallel branches may include a plurality of LEDs connected in series in a same direction.

The illuminant may include a plurality of LED anti-parallel circuits connected in parallel. Each of the plurality of LED anti-parallel circuits may include a plurality of LED parallel branches; and each of the plurality of LED parallel branches may include a plurality of LEDs connected in series in a same direction.

The illuminant further may include a rectifying circuit electrically connected between the LED circuit and the pair of output terminals of the toroidal transformer. The rectifying circuit may be a bridge rectifying circuit.

BRIEF DESCRIPTION OF THE DRAWINGS

FIG. 4-1 and FIG. 4-2 are schematic structural diagrams of a toroidal transformer in the present application;

DETAILED DESCRIPTION

The present invention is described in further detail below with reference to embodiments and the accompanying drawings.

Figure 1:
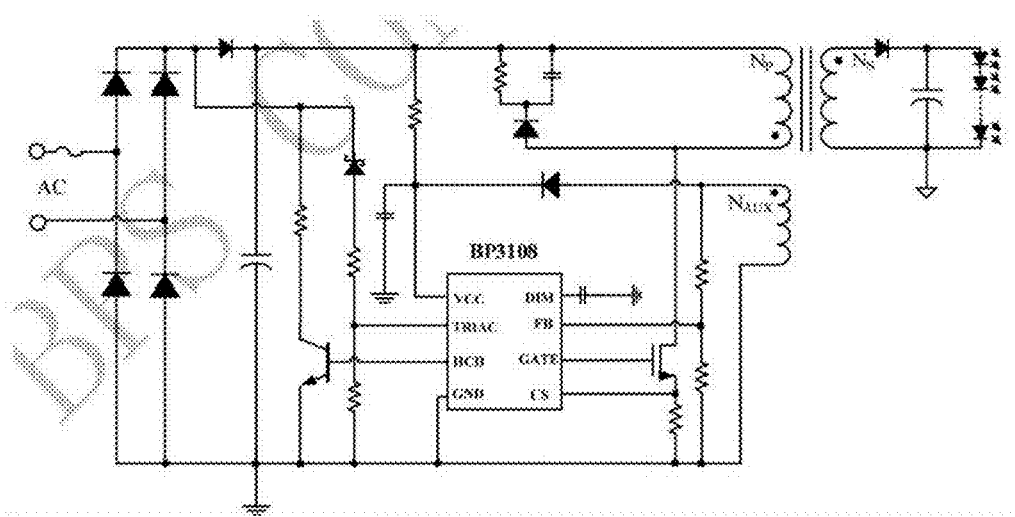
FIG. 1 is a schematic diagram of an LED drive circuit in the prior art.
Figure 2:
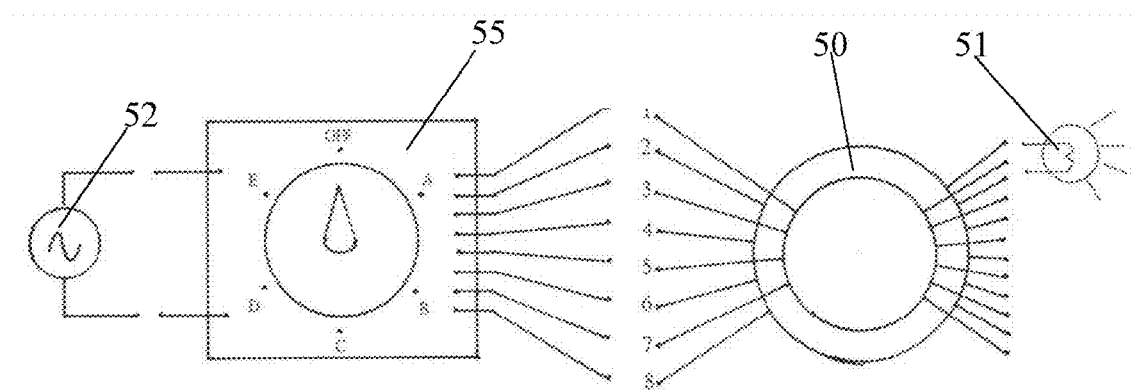
FIG. 2 is a schematic structural diagram of an LED lighting system in the present application.
Figure 3:
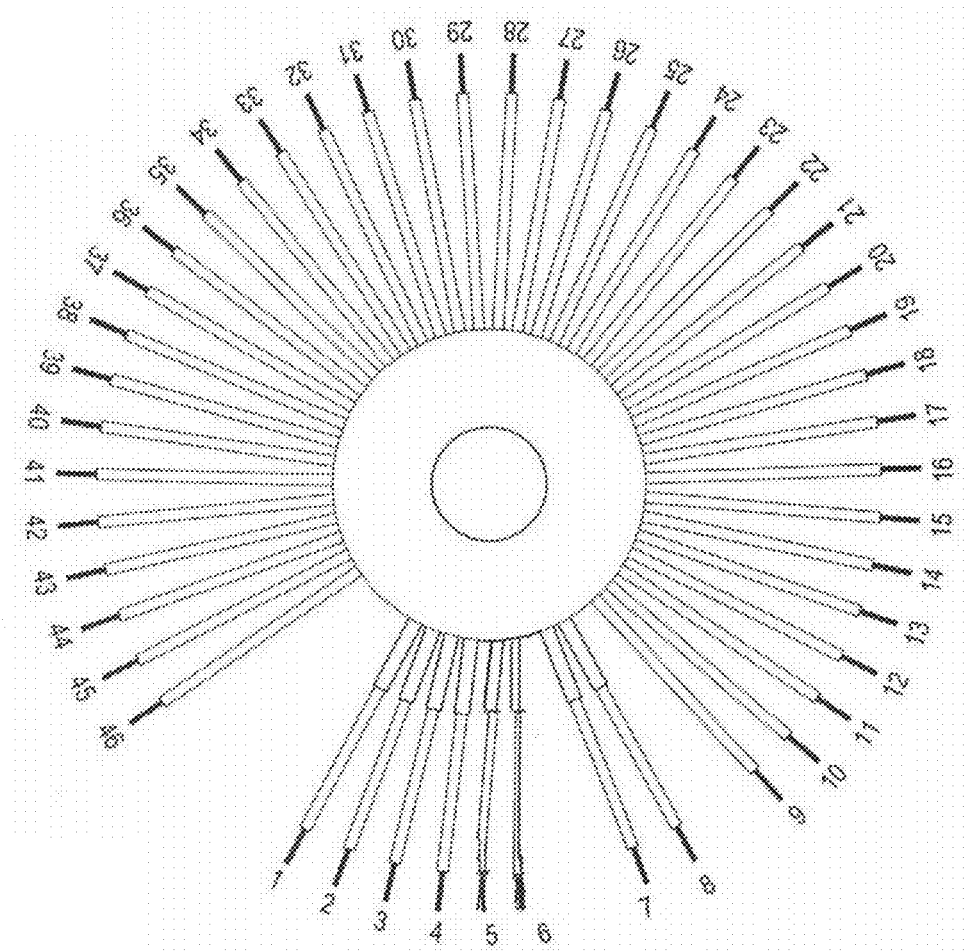
FIG. 3 is a top view of a toroidal transformer in the present application.
Figures 1, 4:
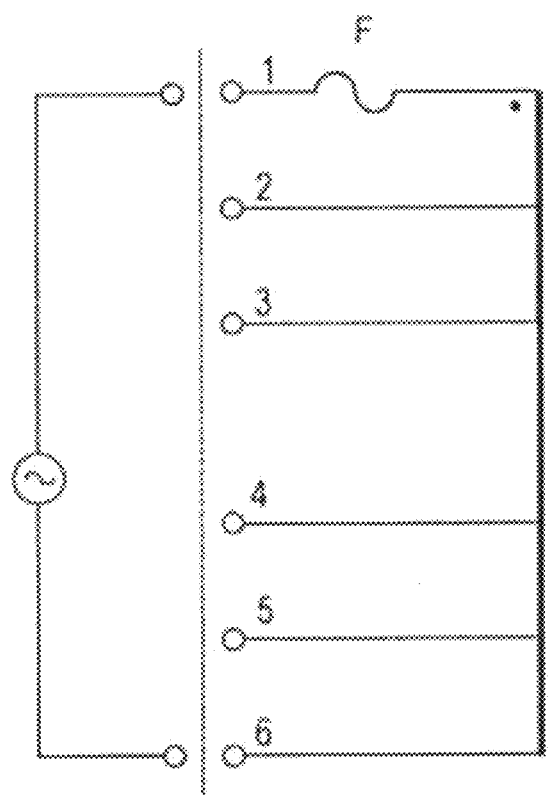
Figures 2, 4:
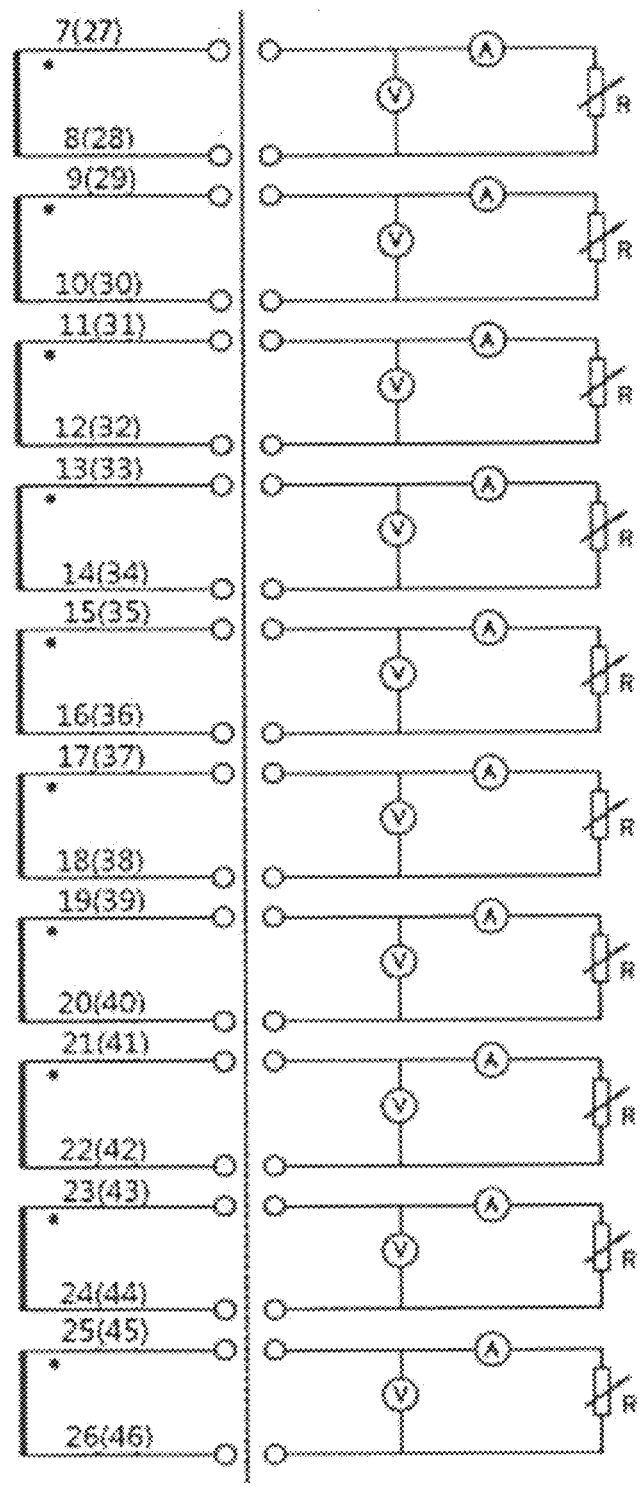

For an LED lighting system according to an embodiment of the present application, reference may be made to FIG. 2 to FIG. 9. As shown in FIG. 2, the LED lighting system according to the embodiment of the present application includes a toroidal transformer 50 and an illuminant 51. As shown in FIG. 4-1 and FIG. 4-2, the toroidal transformer 50 has at least one pair of input terminals and at least one pair of output terminals. One or multiple illuminants 51 may be provided. Each of the illuminants 51 is connected to one pair of output terminals of the toroidal transformer 50. Multiple illuminants 51 are separately connected to multiple pairs of output terminals of the toroidal transformer 50.

Figure 7:
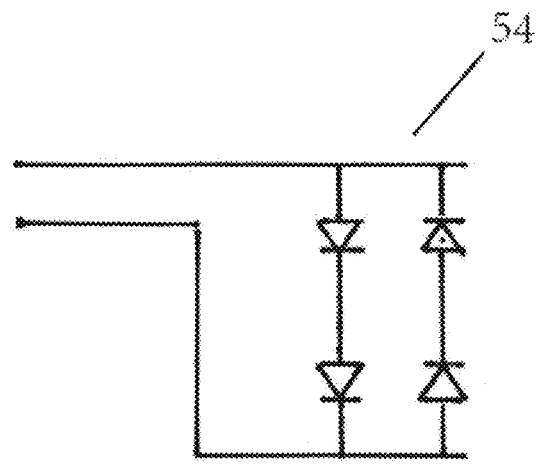
FIG. 7 is a first structural diagram of an alternating-current illuminant circuit in the present application.

Each of the illuminants 51 has at least one LED circuit 54. The LED circuit 54 may include an LED anti-parallel circuit. The LED anti-parallel circuit refers to that the circuit has at least two LEDs connected in parallel reversely; that is, the circuit includes at least two LED branches, the two LED branches are connected in parallel, each branch is provided with one LED, and the two LEDs of the two branches are disposed reversely. In other words, a positive pole and a negative pole of the LED in one branch are connected to a negative pole and a positive pole of the LED in the other branch, respectively. Besides, each LED parallel branch in the LED anti-parallel circuit may also include multiple LEDs connected in series in a same direction. For example, each LED parallel branch includes two LEDs connected in series in a same direction. In this case, one LED anti-parallel circuit has four LEDs, as shown in FIG. 7.

Figure 8:
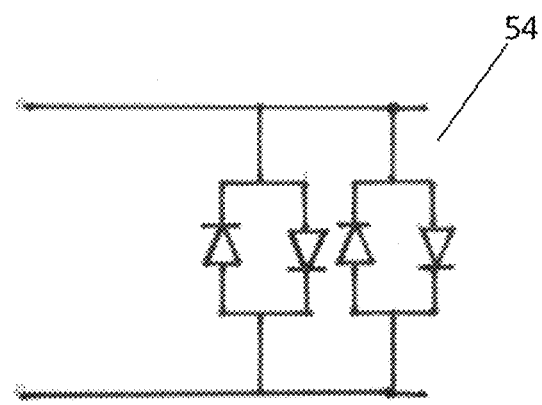
FIG. 8 is a second structural diagram of an alternating-current illuminant circuit in the present application.
Figure 9:
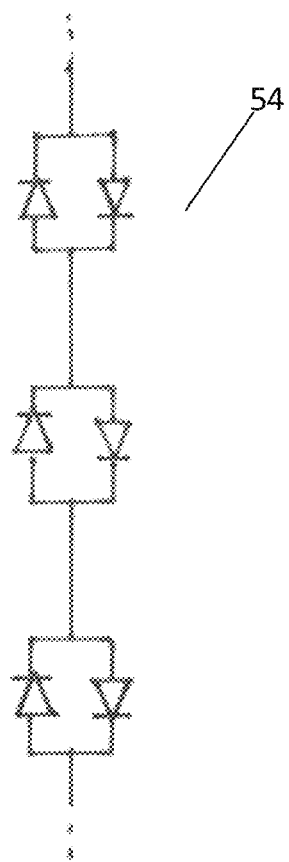
FIG. 9 is a third structural diagram of an alternating-current illuminant circuit in the present application.

Each of the illuminants 51 may include multiple LED anti-parallel circuits. The multiple LED anti-parallel circuits may be connected in parallel (as shown in FIG. 8), and may also be connected in series (as shown in FIG. 9).

Figure 5:
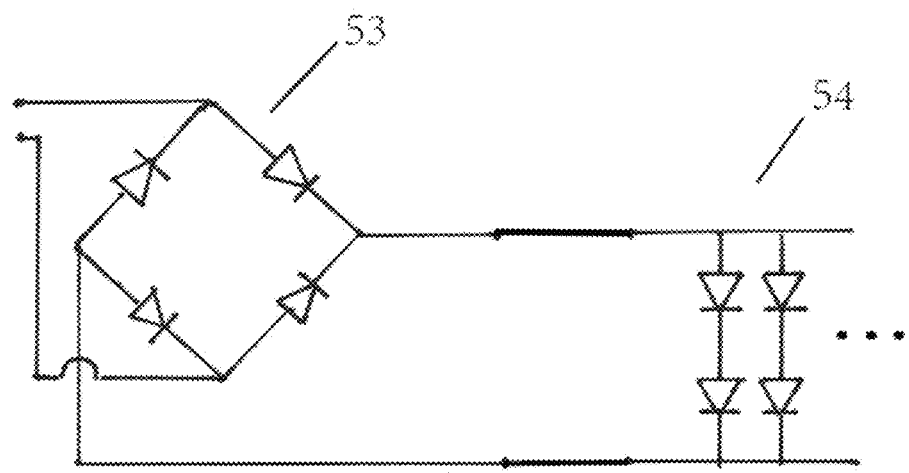
FIG. 5 is a first structural diagram of a direct-current illuminant circuit in the present application.
Figure 6:
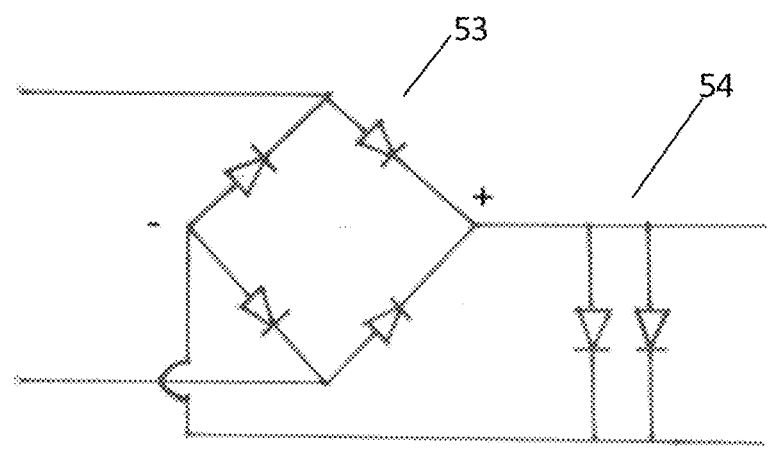
FIG. 6 is a second structural diagram of a direct-current illuminant circuit in the present application.

Referring to FIG. 5 and FIG. 6, each of the illuminants 51 may further include a rectifying circuit 53 connected between output terminals of the toroidal transformer 50 and the LED circuit 54. For example, a bridge rectifier circuit may be used, where an input terminal of the bridge rectifier circuit is connected to a pair of output terminals of the toroidal transformer 50, and an output terminal of the bridge rectifier circuit is connected to an input terminal of the LED circuit 54. The LED circuit 54 may include an LED unidirectional-parallel circuit. The LED unidirectional-parallel circuit refers to that the circuit has at least two LEDs connected in parallel in a same direction; that is, the circuit includes at least two LED branches, the two LED branches are connected in parallel, each branch is provided with one LED, and the two LEDs of the two branches are disposed in a same direction. In other words, a positive pole of the LED in one branch is connected to a positive pole of the LED in the other branch, and a negative pole of the LED in one branch is connected to a negative pole of the LED in the other branch, as shown in FIG. 6. Besides, each LED parallel branch in the LED unidirectional-parallel circuit may also include multiple LEDs connected in series in a same direction. For example, each LED parallel branch includes two LEDs connected in series in a same direction. In this case, one LED unidirectional-parallel circuit has four LEDs, as shown in FIG. 5.

In an actual industry application, the illuminant 51 may exist as an independent element; an illuminant 51 only including an LED circuit 54 is an alternating-current illuminant, and an illuminant 51 including an LED circuit 54 and a rectifying circuit 53 is a direct-current illuminant. In this way, whether the illuminant 51 is an alternating-current illuminant or a direct-current illuminant, it can be directly connected to output terminals of the toroidal transformer 50, and it is unnecessary to modify other circuits in the whole system except the illuminant 51, which facilitates the construction of the whole lighting system. In other words, in the whole system, the illuminant 51 exists as an independent device and the toroidal transformer 50 exists as another independent device. When the system is constructed, output terminals of the toroidal transformer 50 may be directly connected to an input terminal of the illuminant 51, and therefore it is very convenient to construct the system.

The toroidal transformer 50 may only have one pair of input terminals, which are directly connected to an external alternating current power source. The toroidal transformer 50 may also have multiple pairs of input terminals. For example, as shown in FIG. 3, terminals 1-8 are input terminals, terminals 9-46 are output terminals, and every two neighboring output terminals form a pair of output terminals. At this time, as shown in FIG. 2, the LED lighting system may include a switch circuit 55 to switch among the multiple input terminals of the toroidal transformer 50. An input terminal of the switch circuit 55 is connected to the external alternating power source 52, and an output terminal of the switch circuit 55 is connected to one of the multiple pairs of input terminals of the toroidal transformer 50 in a switching manner.

An alternating current power source of 220V is used as an example, and a fluctuation range of 5-10% may be taken into consideration; therefore, the toroidal transformer 50 can offer five pairs of input terminals, of which configuration voltages are 198V, 209V, 220V, 231V, and 242V. The configuration voltage of a pair of input terminal refers to that, when the input terminal inputs the configuration voltage, a pair of output terminal can obtain a corresponding standard configuration voltage, for example, 6V. In other words, when a voltage of 220V is input via a pair of input terminal whose configuration voltage is 220V, a pair of output terminal obtains a standard configuration output voltage of 6V. If a voltage of 220V is input via a pair of input terminal whose configuration voltage is 198V, because the input voltage is higher than the configuration voltage of the input terminal of the toroidal transformer 50, a corresponding output voltage is also higher than a standard configuration output voltage (6V). If a voltage of 220V is input via a pair of input terminal whose configuration voltage is 242V, because the input voltage is lower than the configuration voltage of the input terminal of the toroidal transformer 50, a corresponding output voltage is also lower than a standard configuration output voltage (6V). In this way, assuming that an LED has standard brightness when an output voltage is 6V, when an alternating current power source of 220V is connected to a pair of input terminal whose configuration voltage is 220V through the switch circuit, the LED has standard brightness; when an alternating current power source of 220V is connected to a pair of input terminal whose configuration voltage is 198V through the switch circuit, the LED is brighter relative to the standard brightness; and when an alternating current power source of 220V is connected to a pair of input terminal whose configuration voltage is 242V through the switch circuit, the LED is dimmer relative to the standard brightness. That is, by means of switching of the switch circuit, the brightness of the LED can be adjusted.

Besides, the input terminal of the switch circuit 55 may also be connected, in a switching manner, to one of multiple alternating current power sources having different electrical parameters. For example, two alternating current power sources having an output voltage of 110V and an output voltage of 220V may be provided. The input terminal of the switch circuit may connect an alternating current power source of 110V or an alternating current power source of 220V to the illuminant system in the embodiment of the present application in a switching manner. In the case of an alternating current power source with an output voltage of 110V, similarly, a toroidal transformer provided with input terminals whose configuration voltages are 100V, 110V and 120V is used as an example. When the alternating current power source of 110V is connected to the input terminal whose configuration voltage is 110V through the switch circuit, the LED has standard brightness; when the alternating current power source of 110V is connected to the input terminal whose configuration voltage is 100V through the switch circuit, the LED is brighter relative to the standard brightness; and when the alternating current power source of 110V is connected to the input terminal whose configuration voltage is 120V through the switch circuit, the LED is dimmer relative to the standard brightness. By means of switching of the switch circuit 55, the brightness of the LED can be adjusted.

It should be noted that, the parameters described above, that is, the output voltage of the external alternating current power source to which the switch circuit is connected, the configuration voltage of the input terminal of the toroidal transformer 50, and the like, are all specific examples, and may be adjusted according to actual needs in an actual application.

A toroidal transformer is generally applied to household appliances and other electronic equipment with higher technical requirements, and is made by copper coils winded around a ring-shaped iron core. The iron core of the toroidal transformer is generally made by seamlessly rolling a cold rolled silicon steel sheet of high quality. Coils of the toroidal transformer are evenly winded around the iron core. The direction of a magnetic line produced by the coils almost overlaps with a magnetic path of the iron core; the electrical efficiency is high and a no-load current is small. The toroidal transformer has a small size, a light weight, small magnetic interference, and a low operating temperature, and is easy to install.

The following four lights are tested and compared:
1. A PHILIPS MR15 GU5.3 warm white spotlight, which is 12V and 20 Watts, is used as a reference, and a win60 driver is used;
2. An Actfair MR16 AC/DC LED light, 12V and 4 Watts, made in Hong Kong, with an NGL-L20 driver;
3. A toroidal transformer with a TR16 light, where the light is modified by using the Actfair MR16 LED of 12V described above, and after rectification, the LED is directly driven; and
4. A toroidal transformer with an STR16 light (alternating current), where the light is modified by using the Actfair MR16 LED of 12V described above; all electronic circuits, including a rectifying part, are removed, and only an LED part is reserved, modification is made so that four LEDs are reversely connected in a light, and two lights are connected in a series to adapt to an alternating current voltage of about 6V.

The test table is as follows:

| | Voltage of power source V volt | Current of power source A ampere | Power P watt | Power Factor PF (%) | Light voltage V1 volt | Light current A1 ampere | Illumination Lux | Surface temperature T degree(centigrade) |
|---|---|---|---|---|---|---|---|---|
| PHILIPS MR16 | 220 | 0.018 | 17.8 | 0.994 | | | 3850 | >120 |
| Actfair LED MR16 | 220 | 0.027 | 4.73 | 0.798 | | | 5400 | 58 |
| Toroid + TR16 | 220 | 0.322 | 63.1/20 | 0.891 | 5.8 | 0.56 | 3900 | 58 |
| Toroid + STR16 | 220 | 0.322 | 6.29/2 | 0.891 | 5.7 | 0.68 | 3500x2 | 57 |

It can be seen from the above table that, the LED lighting system in the embodiment of the present application can achieve the following beneficial effects:

1. Energy benefit: A toroidal transformer can reduce energy consumption, and a loss rate of the toroidal transformer is approximately lower than 3%. The LED lighting system of the present application can save about 15% of energy compared with a direct current LED using a driver, and can save up to 70% of energy compared with the conventional MR16.

2. Environmental protection benefit: besides the LED, another part of the LED lighting system is the toroidal transformer, of which the main materials are copper wires and an iron core or a silicon steel sheet, and a reuse rate thereof can be up to 70%. Compared with a current process in which abandoned lights need to be processed, the LED lighting system of the present application can greatly reduce abandoned wastes, thereby saving a lot of manpower and material resources, which is beneficial to environmental protection.

3. Economic benefit: With the concept of multiple outputs, a toroidal transformer can drive multiple LEDs at the same time, which is applicable to a light with multiple LEDs and high power. The cost is lower when more LEDs are driven. For example, if the toroidal transformer drives 20 LEDs, the economic benefit is better than that of an equivalent design of 20 independent drivers.

4. A toroidal transformer has a long service life if used normally, which is especially applicable to places where it is difficult to replace a light; the replacement frequency can be greatly lowered, and the workload of maintenance and repairing can be reduced.

The present application uses a toroidal transformer to drive an LED for lighting, which can reduce the number of electronic elements used, thereby reducing costs, and on the other hand, a service life of a product can be prolonged, which is beneficial to environmental protection.

The above content is further detailed descriptions of the present application with reference to the embodiments, and it should not be considered that the specific implementation of the present application is merely limited to these descriptions. Any simple deduction or replacement made by a person of ordinary skill in the art without departing from the thought of the present application should be construed as falling within the protection scope of the present application.

What is claimed is:

1. A light-emitting diode (LED) lighting system, comprising:
   a plurality of external alternating current power sources having different electrical parameters;
   a switch circuit comprising an input terminal and an output terminal, and the input terminal of the switch circuit being electrically connected to one of the plurality of external alternating current power sources in a switching manner;
   a toroidal transformer comprising a plurality pairs of input terminals and a plurality pairs of output terminals, and the output terminal of the switch circuit being electrically connected to one pair of the plurality pairs of input terminals of the toroidal transformer in a switching manner; and
   a plurality of illuminants each comprising an LED circuit, and each of the plurality of illuminants being electrically connected to one pair of the plurality pairs of output terminals of the toroidal transformer.

2. The LED lighting system according to claim 1, wherein each of the plurality of illuminants comprises a plurality of LED anti-parallel circuits connected in series.

3. The LED lighting system according to claim 1, wherein each of the plurality of illuminants comprises a plurality of LED anti-parallel circuits connected in parallel.

4. The LED lighting system according to claim 1, wherein each of the plurality of illuminants further comprises a rectifying circuit electrically connected between the LED circuit and the one pair of the plurality pairs of output terminals of the toroidal transformer.

5. The LED lighting system according to claim 1, wherein the LED circuit comprises an LED anti-parallel circuit.

6. The LED lighting system according to claim 5, wherein the LED anti-parallel circuit comprises a plurality of LED parallel branches; and each of the plurality of LED parallel branches comprises a plurality of LEDs connected in series in a same direction.

7. A light-emitting diode (LED) lighting system, comprising:
   a toroidal transformer comprising a pair of input terminals and a pair of output terminals; and
   an illuminant comprising an LED circuit;
   wherein the illuminant is electrically connected to the pair of output terminals of the toroidal transformer.

8. The LED lighting system according to claim 7, comprising:
   a plurality of illuminants;
   wherein the toroidal transformer comprises a plurality pairs of output terminals; and
   each of the plurality of illuminants is electrically connected to one pair of the plurality pairs of output terminals of the toroidal transformer.

9. The LED lighting system according to claim 7, further comprising:
   a switch circuit comprising an input terminal and an output terminal;
   wherein the toroidal transformer comprises a plurality pairs of input terminals; and the input terminal of the switch circuit is electrically connected to an external alternating current power source, and the output terminal of the switch circuit is electrically connected to one pair of the plurality pairs of input terminals of the toroidal transformer in a switching manner.

10. The LED lighting system according to claim 7, further comprising:
    a switch circuit comprising an input terminal and an output terminal; and
    an external alternating current power source connected to the input terminal of the switch circuit;
    wherein the toroidal transformer comprises a plurality pairs of input terminals; and the output terminal of the switch circuit is electrically connected to one pair of the plurality pairs of input terminals of the toroidal transformer in a switching manner.

11. The LED lighting system according to claim 7, further comprising:
    a switch circuit comprising an input terminal and an output terminal; and
    a plurality of external alternating current power sources having different electrical parameters;
    wherein the input terminal of the switch circuit is electrically connected to one of the plurality of external alternating current power sources in a switching manner; and the toroidal transformer comprises a plurality pairs of input terminals; and the output terminal of the switch circuit is electrically connected to one pair of the plurality pairs of input terminals of the toroidal transformer in a switching manner.

12. The LED lighting system according to claim 11, wherein the plurality of external alternating current power sources comprise an alternating current power source having an output voltage of 110V and an alternating current power source having an output voltage of 220V.

13. The LED lighting system according to claim 7, wherein the LED circuit comprises an LED anti-parallel circuit.

14. The LED lighting system according to claim 13, wherein the LED anti-parallel circuit comprises a plurality of LED parallel branches; and each of the plurality of LED parallel branches comprises a plurality of LEDs connected in series in a same direction.

15. The LED lighting system according to claim 7, wherein the illuminant comprises a plurality of LED anti-parallel circuits connected in series.

16. The LED lighting system according to claim 15, wherein each of the plurality of LED anti-parallel circuits comprises a plurality of LED parallel branches; and each of the plurality of LED parallel branches comprises a plurality of LEDs connected in series in a same direction.

17. The LED lighting system according to claim 7, wherein the illuminant comprises a plurality of LED anti-parallel circuits connected in parallel.

18. The LED lighting system according to claim 17, wherein each of the plurality of LED anti-parallel circuits comprises a plurality of LED parallel branches; and each of the plurality of LED parallel branches comprises a plurality of LEDs connected in series in a same direction.

19. The LED lighting system according to claim 7, wherein the illuminant further comprises a rectifying circuit electrically connected between the LED circuit and the pair of output terminals of the toroidal transformer.

20. The LED lighting system according to claim 19, wherein the rectifying circuit is a bridge rectifying circuit.

* * * * *